United States Patent
Ryle et al.

(10) Patent No.: US 11,756,217 B2
(45) Date of Patent: Sep. 12, 2023

(54) MULTI-CAMERA SYSTEM TO PERFORM MOVEMENT PATTERN ANOMALY DETECTION

(71) Applicant: Eaton Intelligent Power Limited, Dublin (IE)

(72) Inventors: James Patrick Ryle, Dublin (IE); Kaushal Joshi, Haldwani (IN); Nagendra Kumar, Wena (IN); Mangesh Mahadeo Kale, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 149 days.

(21) Appl. No.: 17/404,641

(22) Filed: Aug. 17, 2021

(65) Prior Publication Data

US 2023/0058106 A1    Feb. 23, 2023

(51) Int. Cl.
  *G06T 7/73*    (2017.01)
  *G06T 7/292*   (2017.01)
  *G06T 7/246*   (2017.01)

(52) U.S. Cl.
  CPC .............. *G06T 7/292* (2017.01); *G06T 7/248* (2017.01); *G06T 7/251* (2017.01); *G06T 2207/10016* (2013.01)

(58) Field of Classification Search
  CPC .............. H04L 67/1095; H04L 9/0816; H04W 56/001; G06K 9/4609; G06K 7/10475; H04N 5/23222; G06T 7/292; G06T 7/248; G06T 7/251; G06F 3/011; G06F 3/0486; G08B 13/2462
  See application file for complete search history.

(56) References Cited

U.S. PATENT DOCUMENTS

| 7,227,893 B1 | 6/2007 | Srinivasa et al. |
| 10,620,981 B2 * | 4/2020 | Thomas ................. H04L 43/06 |
| 2008/0018738 A1 | 1/2008 | Lipton et al. |
| 2010/0214408 A1 | 8/2010 | McClure et al. |

FOREIGN PATENT DOCUMENTS

CN    113158800 A    7/2021

OTHER PUBLICATIONS

International Search Report and Written Opinion issued in International Application No. PCT/EP2022/025377, dated Nov. 29, 2022, 18 pages.

* cited by examiner

*Primary Examiner* — Phuoc H Doan
(74) *Attorney, Agent, or Firm* — Talem IP Law, LLP (57) ABSTRACT

A method of performing movement pattern anomaly detection with targeted alerts can include receiving input from each camera of a multi-camera system and for each input: performing video content analysis; generating a critical analysis matrix associated with the input from that camera; assigning a fusion value for each vector of the critical analysis matrix using a fusion map that indicates particular fusion values associated with possible elements of the critical analysis matrix; and triggering an alert according to whether the fusion value exceeds a threshold associated with that camera. The critical analysis matrix includes output from at least two different computer vision algorithms of the video content analysis applied to the input from a camera.

20 Claims, 6 Drawing Sheets

MULTI-CAMERA SYSTEM TO PERFORM MOVEMENT PATTERN ANOMALY DETECTION

BACKGROUND

State of the art video surveillance systems, commonly referred to as closed-circuit television (CCTV) systems, do not need security personnel to monitor the CCTV footage. Such systems can send alerts if something abnormal is detected or if desired objects are found. These alerts can be in the form of audio, text messages on a phone, or a call. Typically, advanced CCTV systems support many features for detecting a variety of different objects and actions. However, for each of these features, there is often an alert that goes out to the end-user and these features can trigger alerts many times in a day. Sometimes it is exceedingly difficult for an end-user to handle all of these alerts. As a result, some operators may disable a majority of the alerts from the CCTV system, which can defeat the purpose of deploying these advanced CCTV systems.

BRIEF SUMMARY

A multi-camera system to perform movement pattern anomaly detection is provided that includes an intelligent alert layer. For the intelligent alert layer, a critical analysis matrix is employed, which enables a fusion of the events or features of the multi-camera system and a determination a criticality level for a particular vector of the matrix. Advantageously, targeted alerts can be generated according to preconfigured threshold values for the criticality levels.

A method of performing movement pattern anomaly detection with targeted alerts can include receiving input from each camera of a multi-camera system and for each input performing video content analysis; generating a critical analysis matrix associated with the input from that camera, wherein the critical analysis matrix comprises output from at least two different computer vision algorithms of the video content analysis applied to the input from that camera; assigning a fusion value for each vector of the critical analysis matrix using a fusion map that indicates particular fusion values associated with possible elements of the critical analysis matrix; and triggering an alert according to whether the fusion value exceeds a threshold associated with that camera. Triggering the alert according to whether the fusion value of a vector associated with camera input from a particular camera of the multi-camera system exceeds the threshold associated with that particular camera can include comparing each fusion value to a preconfigured camera threshold value; and if any fusion value exceeds the preconfigured camera threshold value, triggering the alert.

In a specific implementation, the at least two different computer vision algorithms include person detection to classify objects in the input from the camera as a person; red and green zone detection to determine a location of each identified object with respect to defined zones; crowd path heat map detection to determine whether an identified object is in a region learned to be a common area for objects by the performing of crowd path analysis; and gait analysis such that generating the critical analysis matrix includes initializing data fields for a session; assigning a person identifier to a detected person identifier data field of the data fields for each object identified as a person by the video content analysis; assigning a zone identifier to a zone identifier data field to indicate a zone each detected person is located by the video content analysis; assigning a heat map value identifier to a heat map data field to indicate heat map value of a part of the zone each detected person is located by the video content analysis; and assigning a gait analysis identifier to a gait data field to indicate a gait classification for each detected person. Then, assigning the fusion value for each vector comprises assigning a corresponding fusion value for each person identifier at least according to the zone identifier, the heat map value identifier, and the gait analysis identifier for that detected person.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A multi-camera system to perform movement pattern anomaly detection is provided that includes an intelligent alert layer. For the intelligent alert layer, a critical analysis matrix is employed, which enables a fusion of the events or features of the multi-camera system and a determination a criticality level for a particular vector of the matrix. Advantageously, targeted alerts can be generated according to preconfigured threshold values for the criticality levels.

Figure 1:
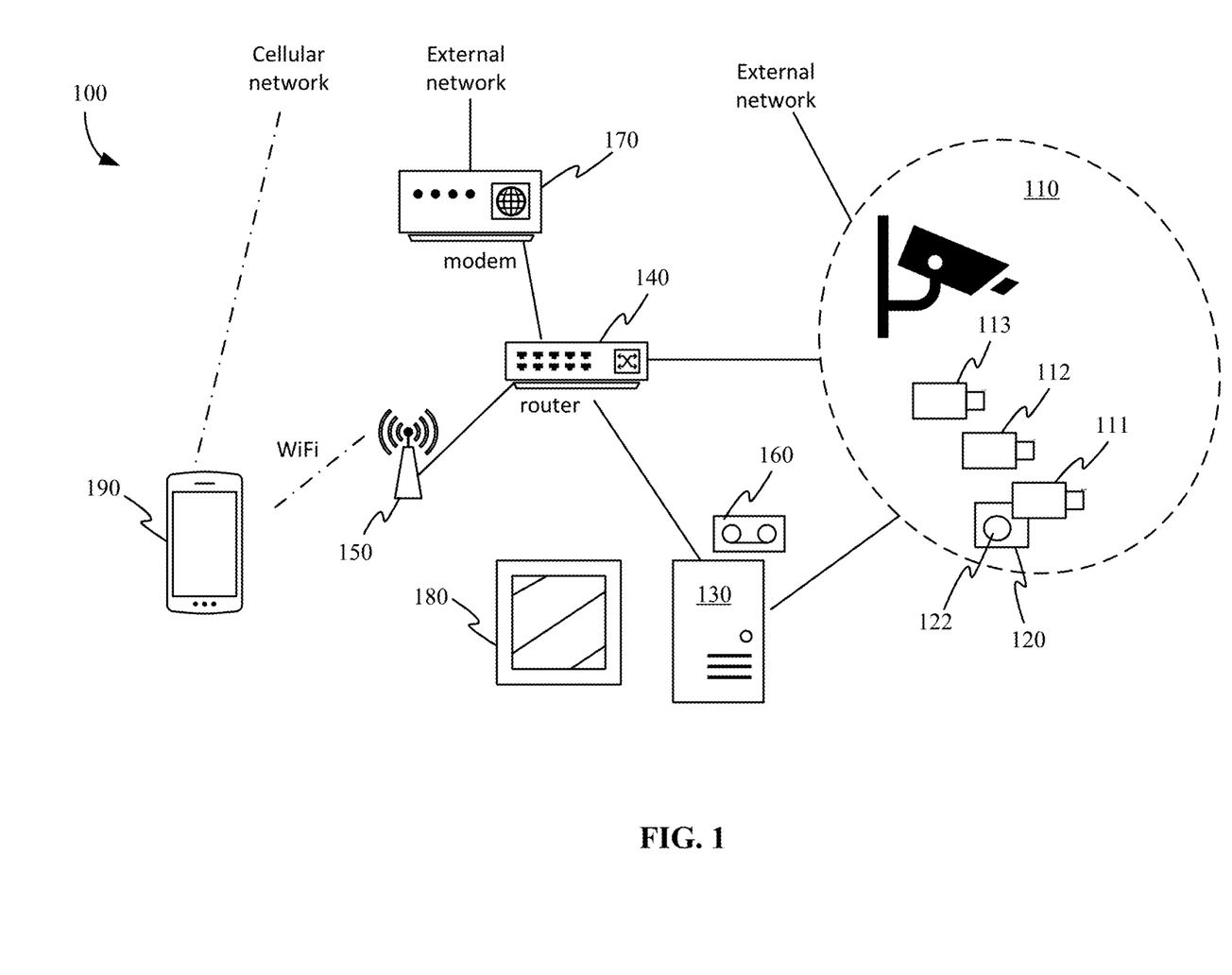
FIG. 1. illustrates an operating environment of a multi-camera system that performs movement pattern anomaly detection.

FIG. 1. illustrates an operating environment of a multi-camera system that performs movement pattern anomaly detection. Referring to FIG. 1, an operating environment 100 for a multi-camera system can include multiple cameras 110 (e.g., first camera 111, second camera 112, third camera 113, and fourth camera 114—but more or fewer cameras may be used). In some cases, a computing device 120 can be located as part of a camera such that input captured by the camera can be stored and even processed at the computing device 120 according to instructions 122 stored and executed at the computing device 120. The cameras 110 may be wired directly to a central computing system 130 or may be or be similar to Internet Protocol cameras that connect to a local network (and central computing system 130 via router 140) by wired means (e.g., ethernet cables) or by wireless means (e.g., as supported by wireless access point 150). In some cases, the cameras 110 can connect to the local network (and router 140) via an external network. Input from the cameras 110 can be stored in a recorder 160 that may be a separate device, part of central computing system 130, or at each camera (e.g., at first camera 111, second camera 112, third camera 113, and fourth camera 114). In some cases, copies of the input may be stored at all or some of these locations.

Video and images captured by the cameras 110 and optionally stored in recorder 160 can be viewed by an operator at display 180. In some cases, video and images captured by the cameras 110 can be viewed by an operator at a user computing device 190. In some cases, user computing device 190 may be a mobile device and can be configured (e.g., with appropriate software) for direct alerts by the multi-camera system (e.g., wired or wirelessly over local network) or by alerts via communication channels such as text message and email, which can be sent by the central computing system 130 (or computing device 120) over the external network.

For the described multi-camera system, input from each of the cameras 110 (and optional other sensors) is used to perform movement pattern anomaly detection. With the camera input, video content analysis is applied at computing device 120, at the central computing system 130, or by a combination of computing device 120 and central computing system 130 operations.

Video content analysis involves application of one or more computer vision algorithms to detect and determine temporal events based on object classification. In addition to recognizing shapes and colors, objects can be classified based on motion behavior and speed. Certain rules can even be applied to designated areas, for example creating virtual tripwires where objects having certain behaviors in those designated areas can trigger an alert. The rules that trigger an alert can relate to access—indicating which objects and when those objects can enter into a specific area and under what circumstances (e.g., who and what time of day). The rules that trigger an alert can also relate to motion situations—for example, whether there is a person moving in an opposite direction to that which is expected. These alerts generated in response to one of the events detected by the video content analysis can be an audio or visual alert, which can be communicated to security personnel (e.g., via user computing device 190).

Video content analysis may be performed at the camera itself (e.g., as edge processing) or at a central server (e.g., central computing system 130).

Although not shown, other sensors (e.g., temperature sensors, acoustic sensors, pressure sensors, etc.) may be included as secondary sensors in operating environment 100 and their inputs captured, stored, and analyzed, for example by central computing system 130. For example, in a case where a secondary sensor is a temperature sensor, performing the analysis on the sensor input can include determining whether a detected temperature satisfies a particular condition. As another example, in a case where the secondary sensor is an acoustic sensor, performing the analysis on the sensor input can include identifying anomalous sounds. In some cases, one or more of the cameras 110 are infrared (IR) cameras. In some cases, IR sensors are separately included in the operating environment 100.

As mentioned above with respect to CCTV systems, there can be many features for detecting a variety of different objects and actions. For example, the video content analysis of the described multi-camera system can support features such as person detection, detection with specific color of clothes, multiple types of animal detection, 2-wheeler, 4-wheeler detection, loitering detection, virtual tripwire, object detection at night, facial recognition, back door entry, rain, and flying insects detection. It can become exceedingly difficult for an end user to handle all of these alerts.

Advantageously, by incorporating an intelligent alert layer between the detection logic (e.g., the rules that trigger an alert from the video content analysis) and the actual triggering of an alert, targeted alerts are possible. The intelligent alert layer can be implemented as software code executed at the central computing system 130.

The intelligent alert layer involves fusion and analysis, incorporating a metric referred to herein as a critical analysis matrix (CAM). The CAM is an intelligent severity level ranking matrix, which indicates the criticality of an event/feature detected by video analytics (e.g., video content analysis). The critical analysis matrix is composed of elements that correspond to each feature or event detected by the various algorithms applied to the sensor signals received by the system. A column of the matrix can be considered a vector of related elements. For example, elements can be identified as being related elements when they correspond to events associated with an identified object (e.g., the actions and characteristics of an identified object). The matrix can include a fusion value element that indicates a criticality level for the other elements of its associated vector of elements. As described in more detail below, the fusion value assigned to a vector of elements can be obtained using a fusion map that indicates particular fusion values associated with possible elements of the critical analysis matrix.

Figure 2:
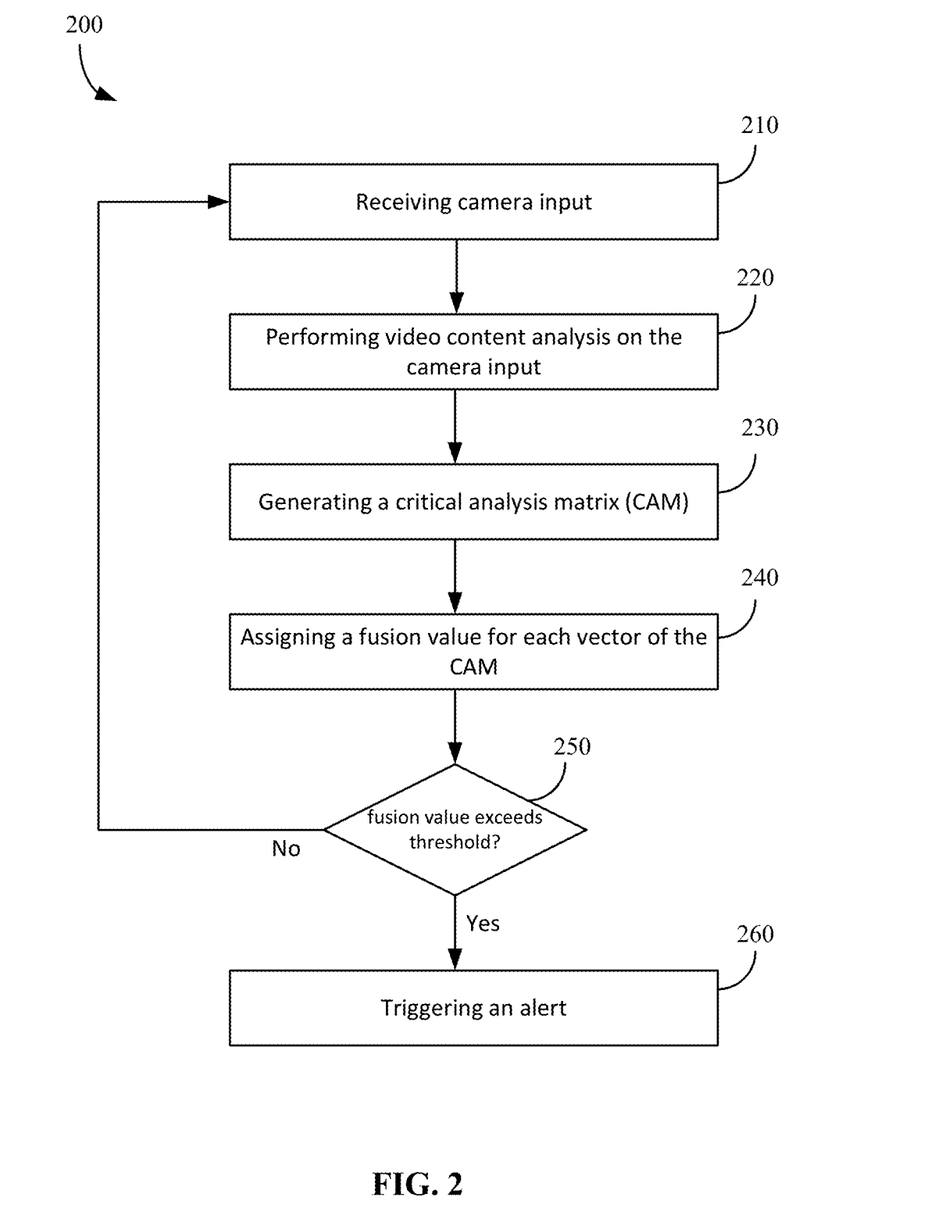
FIG. 2 illustrates an example method of movement pattern anomaly detection with targeted alerts.

FIG. 2 illustrates an example method of movement pattern anomaly detection with targeted alerts. As described with respect to FIG. 1, image data transmitted directly or indirectly from a number of cameras can be received at a local (on premises) server, an off-site server, or cloud server for processing. Referring to FIG. 2, a method 200 of movement pattern anomaly detection with targeted alerts can include receiving (210) input from a camera of a multi-camera system; performing (220) video content analysis on the input from that camera; and generating (230) a critical analysis matrix (CAM) associated with the input from that camera. These same processes can be carried out for each camera of the multi-camera system. The critical analysis matrix is generated from output from at least two different computer vision algorithms of the video content analysis applied to the input from the camera. In some cases, the CAM further includes results of analysis on secondary sensor input (e.g., temperature, acoustic, pressure, etc.). For example, the CAM can include an element of a secondary sensor result identifier in a corresponding data field of the critical analysis matrix.

Once the CAM is generated, the method 200 includes assigning (240) a fusion value for each vector of the critical analysis matrix using a fusion map that indicates particular fusion values associated with possible elements of the critical analysis matrix. The fusion map can be in the form of any suitable data structure. For example, the fusion map may be in the form of a table with permutations of possible elements of the critical analysis matrix and associated fusion values. The fusion values may be in a range from 0 to 5, where 0 is the lowest level of criticality and 5 is the highest level of criticality. Of course, other ranges of values may be used (e.g., 0 to 100; 0.0 to 1.0; 0.00 to 1.00; 1 to 10; 5 to 500, etc.) A fusion of the related features of an event generate an event based on criticality level, resulting in a severity level ranking as an event that can be used by the system to trigger an alert.

A determination (250) can be made for each fusion value as two whether the fusion value exceeds a particular threshold (e.g., a threshold associated with the particular camera of the multi-camera system); and the method can further include triggering (260) an alert according to whether the fusion value exceeds a threshold associated with that camera. This method can be applied to each camera in the multi-camera system in parallel (e.g., applied to input from the first camera 111, second camera 112, third camera 113, and fourth camera 114 of FIG. 1).

Figure 3:
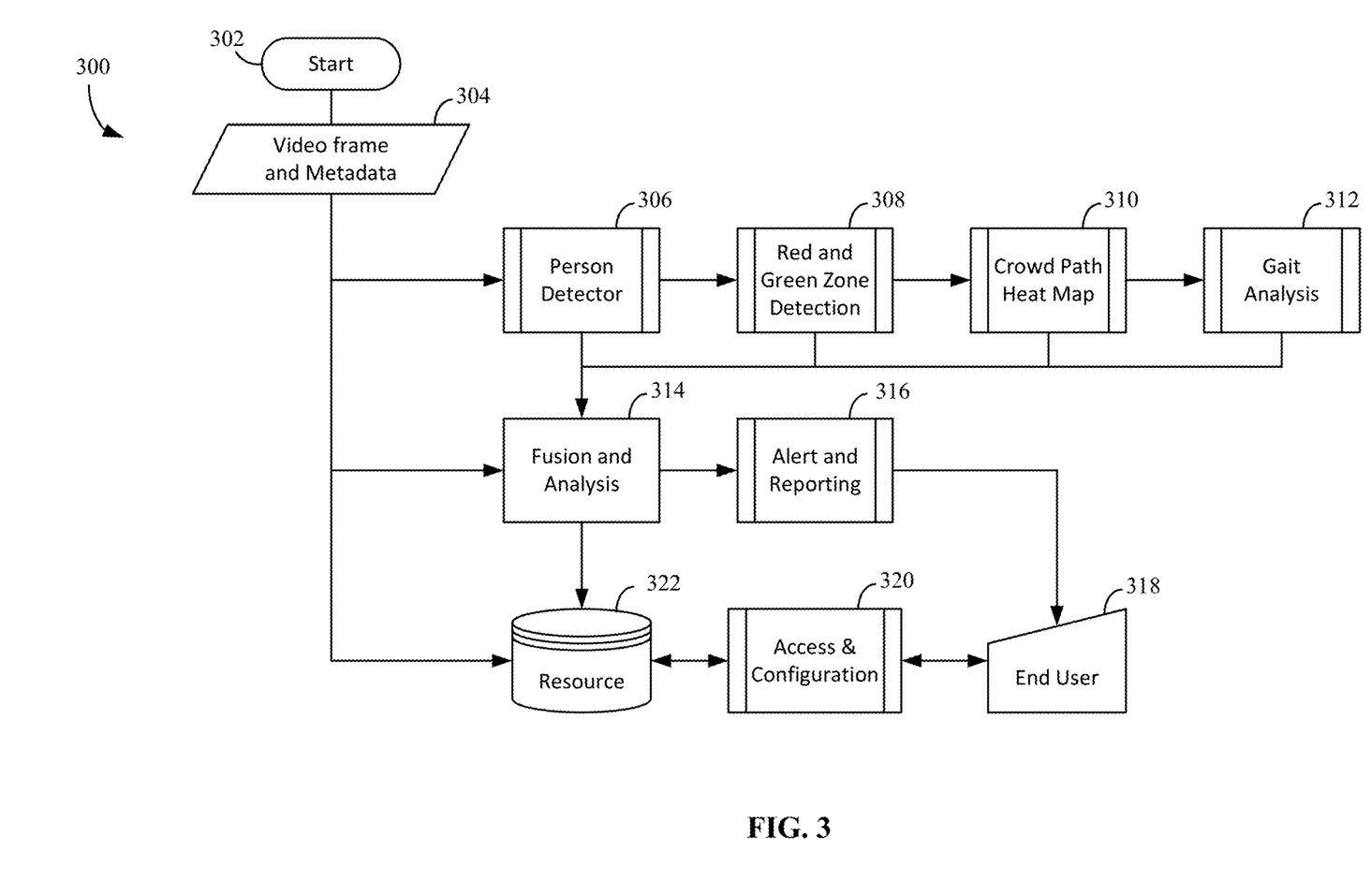
FIG. 3 illustrates an example process flow diagram for movement pattern anomaly detection with targeted alerts.

FIG. 3 illustrates an example process flow diagram for movement pattern anomaly detection with targeted alerts. Referring to FIG. 3, process 300 begins 302 and video frame and metadata 304 is received for use in the various operations, including performing video content analysis. In the illustrated scenario, four different algorithms are applied: a person detector 306 that can classify an object as a person object or a non-person object; a red and green zone detection 308 that can determine whether an identified object is in a designated area of a defined zone; a crowd path heat map detection 310 that can determine whether an identified object is in a region learned to be a common area for objects; and a gait analysis 312. More or fewer video content analysis algorithms may be applied. In addition to the algorithms represented in FIG. 3, other analysis can be carried out on camera data and other sensor data. Here, the output of the person detection 306 can also be used by the red and green zone detection 308 so that each identified person can have their location within or in contact with a defined zone. The location of each identified person can also be detected with respect to a heat map of the area by the crowd path heat map detection 310. In addition, the gait of each identified person is analyzed by the gait analysis 312.

In addition to video content analysis, an intelligent alert layer is provided, in the form of fusion and analysis 314, that receives the results of the various algorithms of the video content analysis (and that can be performed on each of the multitude of cameras such as cameras 110 of FIG. 1 and any additional sensors). The fusion and analysis 314 generates a critical analysis matrix and assigns a fusion value, such as described above with respect to operations 230 and 240 of FIG. 2. Results from the fusion and analysis 314 can be used for alert and reporting operations 316. An end user 318 can receive the alerts (e.g., via user computing device 190 or display 180 of FIG. 1). The end user 318 can modify or otherwise configure various aspects of the multi-camera system for movement pattern anomaly detection via access and configuration operations 320. In some cases, end user 318 can set up the criticality levels for certain alerts, such as described with respect to FIG. 4B. Configuration information, video information (e.g., video frame and metadata 304) and other information, including reporting logs, can be stored at resource 322. In some cases, resource 322 can further store the models (and, in some cases, training data) used by the various computer vision algorithms. Resource 322 may be at a local or remote (e.g., cloud-based) central computing system.

The person detector 306 algorithm can be any suitable algorithm for identifying an object that is a person, including machine learning-based algorithms. Person detection generally involves locating objects in the image or in the frame of a video sequence and classifying the objects at least as person or non-person. In some cases, other objects can be identified. For example, various image classification algorithms may be used to identify objects such as vehicles and animals, as well as details such as clothing and tools (e.g., that are held or on a person).

The red and green zone detection 308 can be used for a virtual tripwire. An end user 318 can configure the zones as part of access and configuration 320 operations. For example, a reference image can be used by the red and green zone detection 308 to check whether the detected person (i.e., as identified by person detector 306) is in a 'No Go Zone.' The reference image can be generated based on input from the end user 318, for example, if the end user 318 wants to make certain area restricted, then a boundary/virtual tripwire is drawn over a sample image. The selected sample image with drawn boundaries is considered as reference image. To draw the boundary of virtual tripwire, system can provide a graphical user interface (GUI) to the end user 318. The end user 318 can draw any type of polygon shape for the boundary of virtual tripwire. There can be multiple polygons in a camera frame. The system can consider these drawn polygons as restricted area (Red Zone) and the rest of the area in the camera frame may be considered as an unrestricted area (Green Zone).

The crowd path heat map 310 estimates the concentration of crowd in surveillance videos and tracks their activity. In some cases, the algorithm includes performing crowd path analysis to generate a heat map from movements of identified objects over time; and performing a crowd path heat map detection to determine whether an identified object is in a region learned to be a common area for objects by the performing of the crowd path analysis.

The crowd path heat map 310 can indicate paths for moving objects as a function of time. For example, certain areas may be common pathways in one direction in the morning and then in the opposite direction in the afternoon. As another example, certain areas may be common pathways during the day during certain days of the week, but not used during a weekend or overnight. The algorithms generating the crowd path heat maps can be machine learning-based algorithms that can learn the paths over time.

According to an example implementation, a frequently used path by people can be termed as 'dense' in Heat Map and also called "common zone". A less used path by people can be denoted as 'sparse' in Heat Map and also called "rare zone". Common zone and rare zone in combination with virtual tripwire determine "No Go Zone". If a person is identified as being located at a common zone, then the person can be considered to be conducting as normal activity. Whereas if a person is found at a rare zone, then the system can be programmed to start observing activity of the person to find further suspicious event.

Gait Analysis 312 involves analysis of people's body movements and motions. Here, gait analysis refers to study of person activity using video surveillance. Gait analysis involves measuring body movement, activity, and mechanics. The analysis of gait pattern is done by continuously tracking the target objects for at least a few seconds by considering various parameters such as position, motion direction, etc. The gate analysis 312 can be implemented using a suitable machine learning algorithm.

Performing gait analysis can include tracking an object for at least two seconds of observation time; computing an average velocity of parts of the object as $$V_{avg} = \frac{D_{Chamfer}(R,I)}{\text{observation time}},$$

where chamfer distance is calculated by:

$$D_{Chamfer}(R, I) = \frac{1}{|R|} \Sigma_{r \in R} d_I(r),$$

where R is a set of points in images received from the input of the camera, I is a set of points in a current frame and $d_I(r)$ is a minimum distance between points r and I; and assigning a person category according to:

$$\text{person category} = \begin{cases} \text{Slow} & \text{if } V_{person} < \alpha_1 V_{avg} \\ \text{Fast} & \text{if } V_{person} > \alpha_2 V_{avg} \\ \text{Typical} & \text{otherwise} \end{cases}$$

where $V_{person}$ is a velocity of a person for whom the person category is getting assigned and $\alpha_1$ (less than 1) and $\alpha_2$ (greater than 1) are regularization parameters.

The system can make multiple deductions from identified walking style and speed. As illustrated above, the gate analysis 312 module can categorize a detected person into one of three groups: "fast"—where people are found running or jumping; "slow"—where people perform actions of slow walking, standing, or falling; and "typical"—where people perform the action of usual walking.

Both the crowd path heat map 310 and the gait analysis 312 can involve site-specific self-learning on the part of the algorithms that implement these features. Each site may have particular activities that are considered typical and a-typical; and such activities can be learned over time. An example for site-specific learned categories is with an IR thermal camera for detecting anomalous heat signatures. In one scenario, if tracking is used for detecting a certain thermal temperature at an airport, the 'typical' thermal temperature would be different than an outdoor sport arena (including detection of sport players on a field during a game as compared to when there is no game occurring on a field).

The performance of the fusion and analysis 314 that fuses results from multiple different approaches to analyzing camera information (e.g., different types of computer vision algorithms) benefits from the diversity and the heterogeneity involved in multiple decisions. The rationale behind this assumption is that the error/drawback of a single decision is compensated by the capability of other decisions; hence, offering improved and robust performance.

Figure 4A:
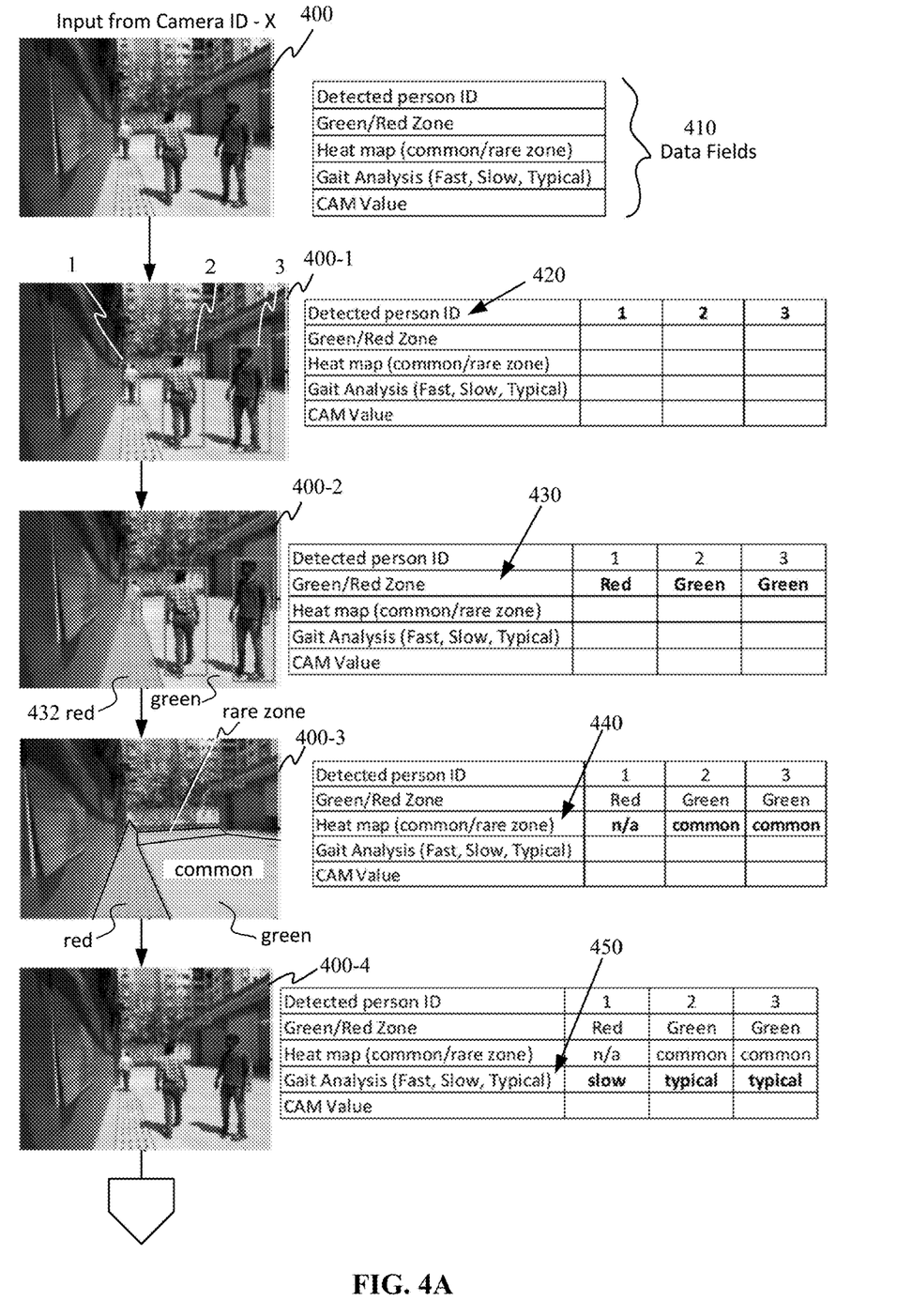
FIGS. 4A-4B illustrate an example scenario of fusion and analysis.
Figure 4B:
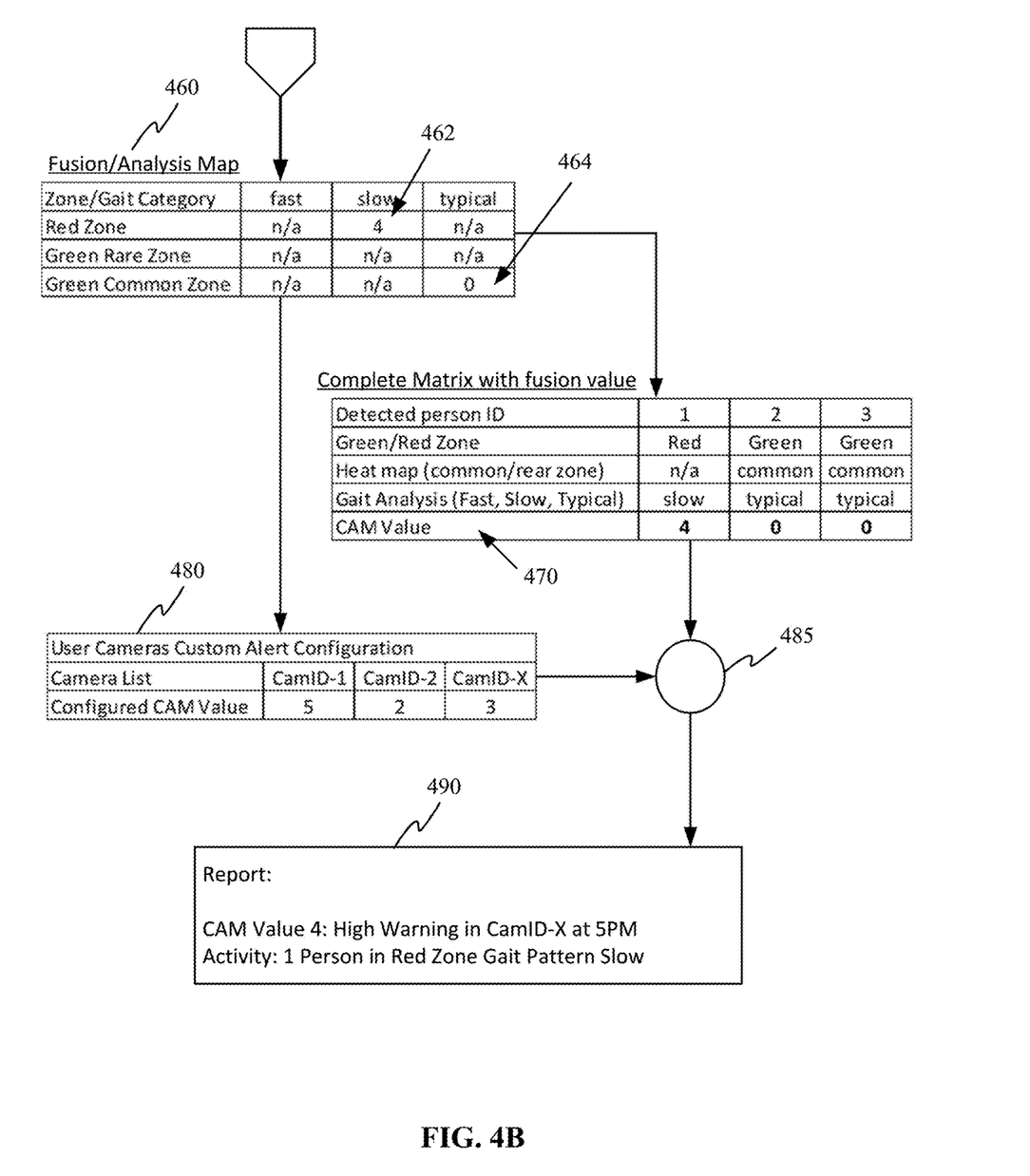

FIGS. 4A-4B illustrate an example scenario of fusion and analysis. As mentioned above, a method of movement pattern anomaly detection with targeted alerts can include receiving input from a camera. In the illustrated scenario input from camera ID-X is shown, for example, image 400 can be received. With reference to both FIG. 4A and FIG. 3, when process 300 begins, and video frames and metadata are received, as part of generating a critical analysis matrix by the fusion and analysis 314, the method can include initializing data fields 410 for the session. Here, the data fields 410 include a detected person identifier data field, a zone identifier data field, a heat map data field, and a gait data field. A fusion value data field ("CAM Value") can further be included as an event element of the matrix. As shown in representative frame 400-1, from the result of the person detector 306, for each detected person found in the image, bounding boxes are drawn. Here, three people are detected, and a person identifier (e.g., 1, 2, and 3) is assigned to the detected person identifier data field 420 of the data fields for each object identified as a person by the video content analysis.

As shown in representative frame 400-2, from the red and green zone detection 308, information from a virtual tripwire is used to obtain a red or green zone category for each detected person. Here, a zone identifier of red or green is assigned to a zone identifier data field 430 to indicate a zone that each detected person is located by the video content analysis. It can be seen that person 1 is detected in the red zone 432; whereas persons 2 and 3 are in the green zone. In some cases, additional zones may be programmed, and corresponding labels used.

As shown in a representative heat map frame 400-3, which shows a path heat map of the camera view, the crowd path heat map 310 classifies regions in the green zone into a common zone and a rare zone such that a determination as to whether any identified persons are in the common zone or the rare zone is made. Thus, a heat map value identifier can be assigned to the heat map data field 440 to indicate heat map value of a part of the zone each detected person is located by the video content analysis. Because the red zone is not further classified into common and rare, the heat map identifier can be omitted, assigned a default value, or assigned a "don't care" value (e.g., represented here by "n/a").

As shown in representative frame 400-4, from the gait analysis 312, a person category can be determined and a gait analysis identifier can be assigned to the gait data field 450 to indicate a gait classification for each detected person (e.g., slow, typical, or fast).

Referring to FIG. 4B, the process continues by assigning a fusion value for each vector. Here, fusion/analysis map 460 is used to determine a corresponding fusion value that is to be assigned for each person identifier according to the zone identifier, the heat map value identifier, and the gait analysis identifier for that detected person. The fusion/analysis map 460 indicates particular fusion values associated with possible elements of the critical analysis matrix. For the current scenario, there is one vector with permutation 462 of red zone with slow gait and two vectors with permutation 464 of green common zone with typical gait.

In this example scenario, each permutation of zone and gait category has an associated fusion value using a range of fusion values between 0 and 5, where a value of 5 represents most critical and 0 represents least critical events. Permutation 462 is assigned fusion value of 4 and permutation 464 is assigned a fusion value of 0. It should be understood that while only two permutations are shown in the table with associated fusion values, each permutation would have an associated fusion value a table of every permutation is provided a fusion value. In some cases, a pre-set map may be provided, which may be modified by an end user for their specific site and needs.

The resulting fusion values are included in the matrix in the fusion data value field 470. The fusion values are then used as the event to trigger an alert based on whether the fusion value exceeds a threshold associated with a particular camera as defined by a custom alert configuration 480. A custom alert configuration 480 can be set up by an end user to identify the fusion value threshold at which an alert is triggered. The triggering of the alert according to whether the fusion value exceeds the threshold associated with the camera can be carried out by comparing (485) each fusion value to a preconfigured camera threshold value; and if any fusion value exceeds the preconfigured camera threshold value, triggering the alert. In the illustrated example, a report 490 is generated with an alert for CAM value 4: high warning in CamID-X at 5 pm due to activity of 1 person in Red Zone with Gait Pattern Slow. The alert was triggered because, for CamID-X, the preconfigured camera threshold value shown in the configuration 480 is a 3 and the fusion value for person 1 was a 4.

Figure 5:
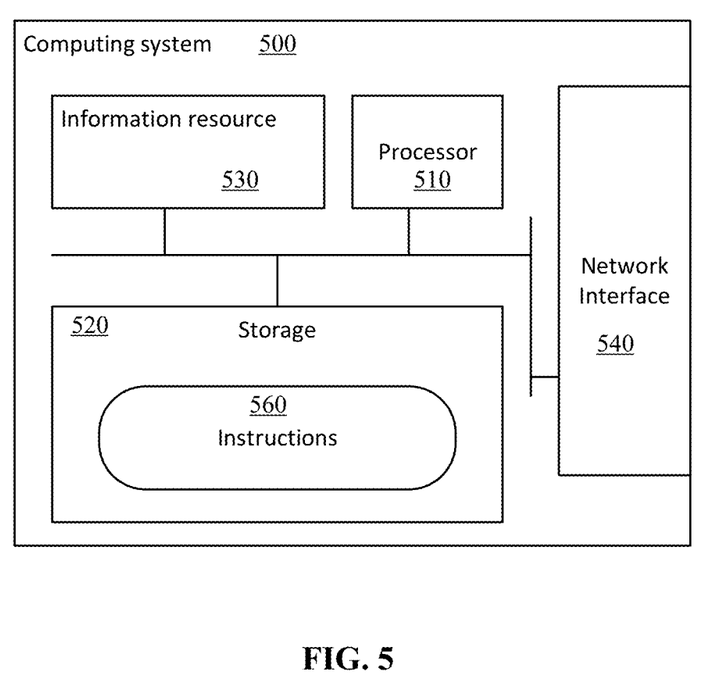
FIG. 5 illustrates a representative computing system of a multi-camera system that performs movement pattern anomaly detection.

FIG. 5 illustrates a representative computing system of a multi-camera system that performs movement pattern anomaly detection. Referring to FIG. 5, a computing system 500 can include at least one processor 510; one or more storage resources including storage 520 and information resource 530 (which can store the configuration information, video information (e.g., video frame and metadata 304) and other information, including reporting logs and the models used by the various computer vision algorithms, such as described with respect to resource 322 of FIG. 3 and the camera information stored at recorder 160 described with respect to FIG. 1); and one or more communications interfaces including network interface 540, which can be used to communicate with and receive input from the cameras of the multi-camera system and provide alerts to user devices over appropriate communication channels (e.g., internet/email, text, etc.).

The at least one processor 510 can include a central processing unit (CPU), a graphics processing unit (GPU), an application specific processor, and logic devices, as well as any other type of processing device, combinations, or variations thereof.

The one or more storage resources can include volatile and non-volatile memories, removable and non-removable media implemented in any method or technology for storage of information, such as computer readable instructions, data structures, program modules, or other data. Examples of storage resources include storage devices in the form of random access memory, read only memory, magnetic disks, optical disks, CDs, DVDs, flash memory, magnetic cassettes, magnetic tape, magnetic disk storage or other magnetic storage devices, or any other suitable storage media. In no case is a storage resource implementing the storage 520 and the information resource 530 a transitory propagated signal. The storage 520 and information resource 530 may be separate storage devices or embodied on a same device. In addition, the storage 520 and information resource 530 may each be implemented as a single storage device or may each be implemented across multiple storage devices or sub-systems co-located or distributed relative to each other.

Storage 520 can store instructions 560 for the processes carried out by the system 500, including method 200 described with respect to FIG. 2 and/or process 300, including the various computer vision algorithms described with respect to FIG. 3. It is further contemplated that said instructions can be stored at any suitable computer-readable storage medium for execution by any multi-camera system. It should be understood that "computer-readable storage medium" does not consist of transitory propagating signals.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

In some cases, certain aspects of the functionality and processes may be performed by one or more services (e.g., cloud services) that the system 500 communicates with to perform said services (e.g., a computer vision algorithm processing service). Of course, any processing performed off-site would be expected to meet appropriate security considerations.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of performing movement pattern anomaly detection with targeted alerts comprising:
   receiving input from a camera of a multi-camera system;
   performing video content analysis on the input from that camera;
   generating a critical analysis matrix associated with the input from that camera, wherein the critical analysis matrix comprises output from at least two different computer vision algorithms of the video content analysis applied to the input from that camera;
   assigning a fusion value for each vector of the critical analysis matrix using a fusion map that indicates particular fusion values associated with possible elements of the critical analysis matrix; and
   triggering an alert according to whether the fusion value exceeds a threshold associated with that camera.

2. The method of claim 1, wherein generating the critical analysis matrix comprises:
   initializing data fields for a session;
   assigning a person identifier to a detected person identifier data field of the data fields for each object identified as a person by the video content analysis;
   assigning a zone identifier to a zone identifier data field to indicate a zone each detected person is located by the video content analysis;
   assigning a heat map value identifier to a heat map data field to indicate heat map value of a part of the zone each detected person is located by the video content analysis; and
   assigning a gait analysis identifier to a gait data field to indicate a gait classification for each detected person.

3. The method of claim 2, wherein assigning the fusion value for each vector comprises assigning a corresponding fusion value for each person identifier according to the zone identifier, the heat map value identifier, and the gait analysis identifier for that detected person.

4. The method of claim 1, wherein triggering the alert according to whether the fusion value exceeds the threshold associated with that camera comprises:
   comparing each fusion value to a preconfigured camera threshold value; and
   if any fusion value exceeds the preconfigured camera threshold value, triggering the alert.

5. The method of claim 1, wherein the input from the camera of the multi-camera system comprises video frames and associated metadata.

6. The method of claim 1, wherein performing video content analysis comprises performing person detection to classify objects in the input from that camera as a person.

7. The method of claim 1, wherein performing video content analysis comprises performing red and green zone detection to determine a location of each identified object with respect to defined zones.

8. The method of claim 1, wherein performing video content analysis comprises performing crowd path analysis to generate a heat map from movements of identified objects over time; and performing a crowd path heat map detection to determine whether an identified object is in a region learned to be a common area for objects by the performing of the crowd path analysis.

9. The method of claim 1, wherein performing video content analysis comprises performing a gait analysis.

10. The method of claim 9, wherein performing the gait analysis comprises:

tracking an object for at least two seconds of observation time;
computing an average velocity of parts of the object as $$V_{avg} = \frac{D_{Chamfer}(R,I)}{\text{observation time}},$$

where chamfer distance is calculated by:

$$D_{Chamfer}(R, I) = \frac{1}{|R|} \sum_{r \in R} d_I(r)$$

where R is a set of points in images received from the input of the camera, I is a set of points in a current frame and $d_I(r)$ is a minimum distance between points r and I; and
assigning a person category according to:

$$\text{person category} = \begin{cases} \text{Slow} & \text{if } V_{person} < \alpha_1 V_{avg} \\ \text{Fast} & \text{if } V_{person} > \alpha_2 V_{avg} \\ \text{Typical} & \text{otherwise} \end{cases}$$

where $V_{person}$ is a velocity of a person for whom the person category is getting assigned and $\alpha_1$ (less than 1) and $\alpha_2$ (greater than 1) are regularization parameters.

11. The method of claim 1, further comprising:
receiving sensor input from a secondary sensor;
performing analysis on the sensor input; and
assigning a result of the analysis on the sensor input as an element of the critical analysis matrix when generating the critical analysis matrix.

12. The method of claim 11, wherein the secondary sensor is a temperature sensor, wherein performing the analysis on the sensor input comprises determining whether a detected temperature satisfies a particular condition.

13. The method of claim 11, wherein the secondary sensor is an acoustic sensor, wherein performing the analysis on the sensor input comprises identifying anomalous sounds.

14. The method of claim 1, wherein the camera comprises an infrared camera.

15. A multi-camera system comprising:
at least one processor;
one or more storage resources; and
instructions stored at the one or more storage resources that when executed by the at least one processor, direct the multi-camera system to perform a method comprising:
receiving input from a camera of a multi-camera system;
performing video content analysis on the input from that camera;
generating a critical analysis matrix associated with the input from that camera, wherein the critical analysis matrix comprises output from at least two different computer vision algorithms of the video content analysis applied to the input from that camera;
assigning a fusion value for each vector of the critical analysis matrix using a fusion map that indicates particular fusion values associated with possible elements of the critical analysis matrix; and
triggering an alert according to whether the fusion value exceeds a threshold associated with that camera.

16. A computer-readable storage medium having instructions stored thereon that when executed by a multi-camera system direct the multi-camera system to at least:
receive input from a camera of a multi-camera system;
perform video content analysis on the input from that camera;
generate a critical analysis matrix associated with the input from that camera, wherein the critical analysis matrix comprises output from at least two different computer vision algorithms of the video content analysis applied to the input from that camera;
assign a fusion value for each vector of the critical analysis matrix using a fusion map that indicates particular fusion values associated with possible elements of the critical analysis matrix; and
trigger an alert according to whether the fusion value exceeds a threshold associated with that camera.

17. The computer-readable storage medium of claim 16, wherein the instructions to generate the critical analysis matrix direct the multi-camera system to:
initialize data fields for a session;
assign a person identifier to a detected person identifier data field of the data fields for each object identified as a person by the video content analysis;
assign a zone identifier to a zone identifier data field to indicate a zone each detected person is located by the video content analysis;
assign a heat map value identifier to a heat map data field to indicate heat map value of a part of the zone each detected person is located by the video content analysis; and
assign a gait analysis identifier to a gait data field to indicate a gait classification for each detected person.

18. The computer-readable storage medium of claim 17, wherein the instructions to assign the fusion value for each vector direct the multi-camera system to:
assign a corresponding fusion value for each person identifier according to the zone identifier, the heat map value identifier, and the gait analysis identifier for that detected person.

19. The computer-readable storage medium of claim 16, wherein the instructions to trigger the alert according to whether the fusion value exceeds the threshold associated with that camera direct the multi-camera system to:
compare each fusion value to a preconfigured camera threshold value; and
if any fusion value exceeds the preconfigured camera threshold value, trigger the alert.

20. The computer-readable storage medium of claim 16, further comprising instructions to:
receive sensor input from a secondary sensor;
perform analysis on the sensor input; and
assign a result of the analysis on the sensor input as an element of the critical analysis matrix when generating the critical analysis matrix.

* * * * *